Sept. 16, 1952     C. FIELD     2,610,475
ART OF CONGELATION AND APPARATUS
FOR USE IN CONNECTION THEREWITH
Filed Aug. 15, 1940     3 Sheets-Sheet 1
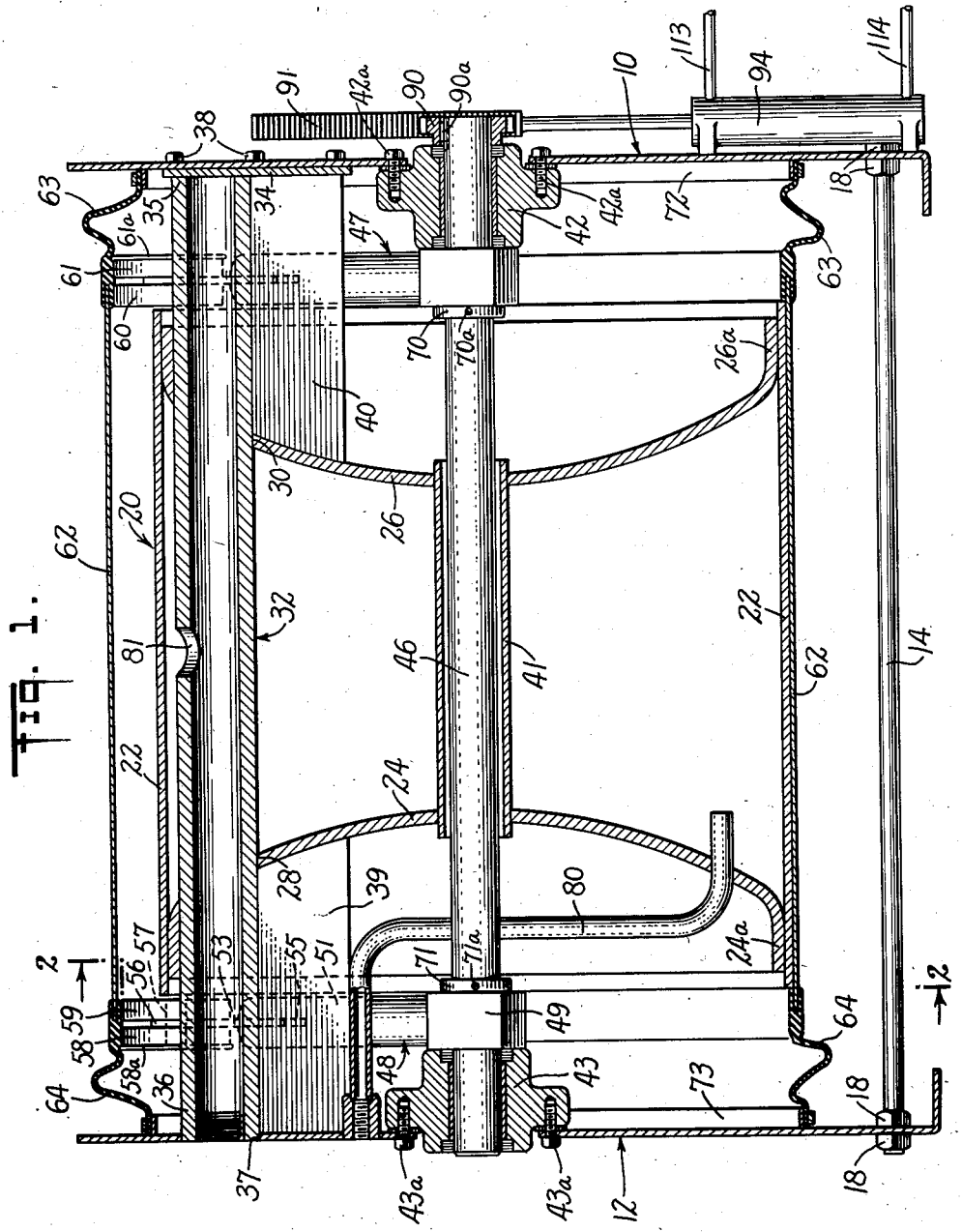
INVENTOR
*Crosby Field*
BY
*Blair, Curtis + Hayward*
ATTORNEYS

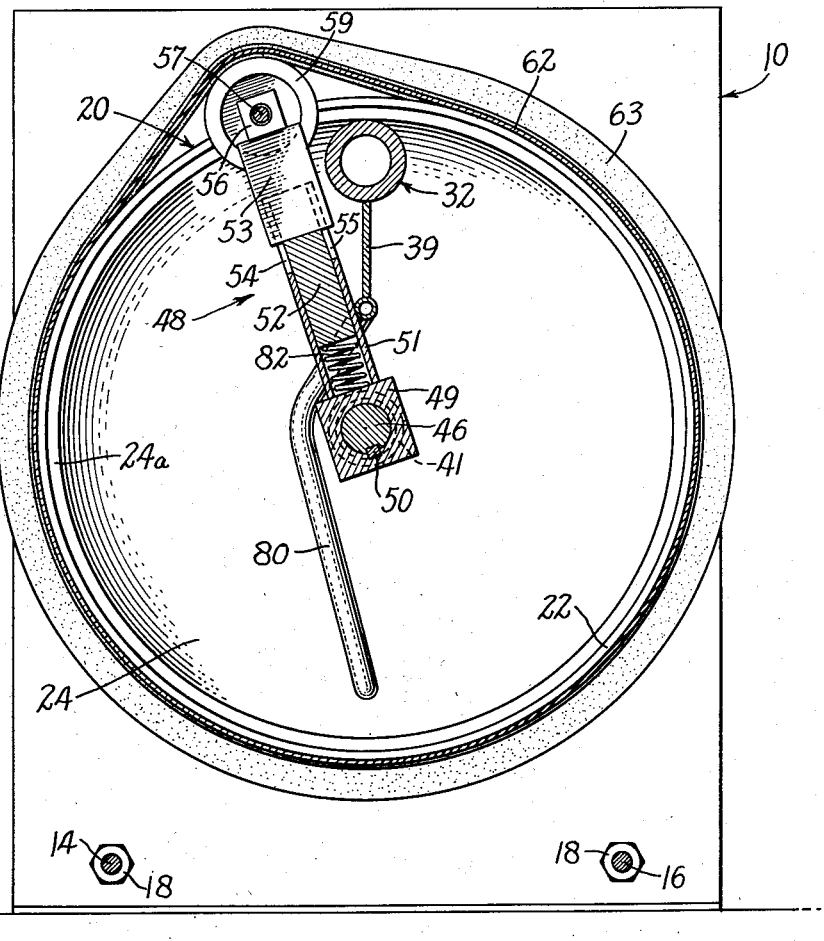

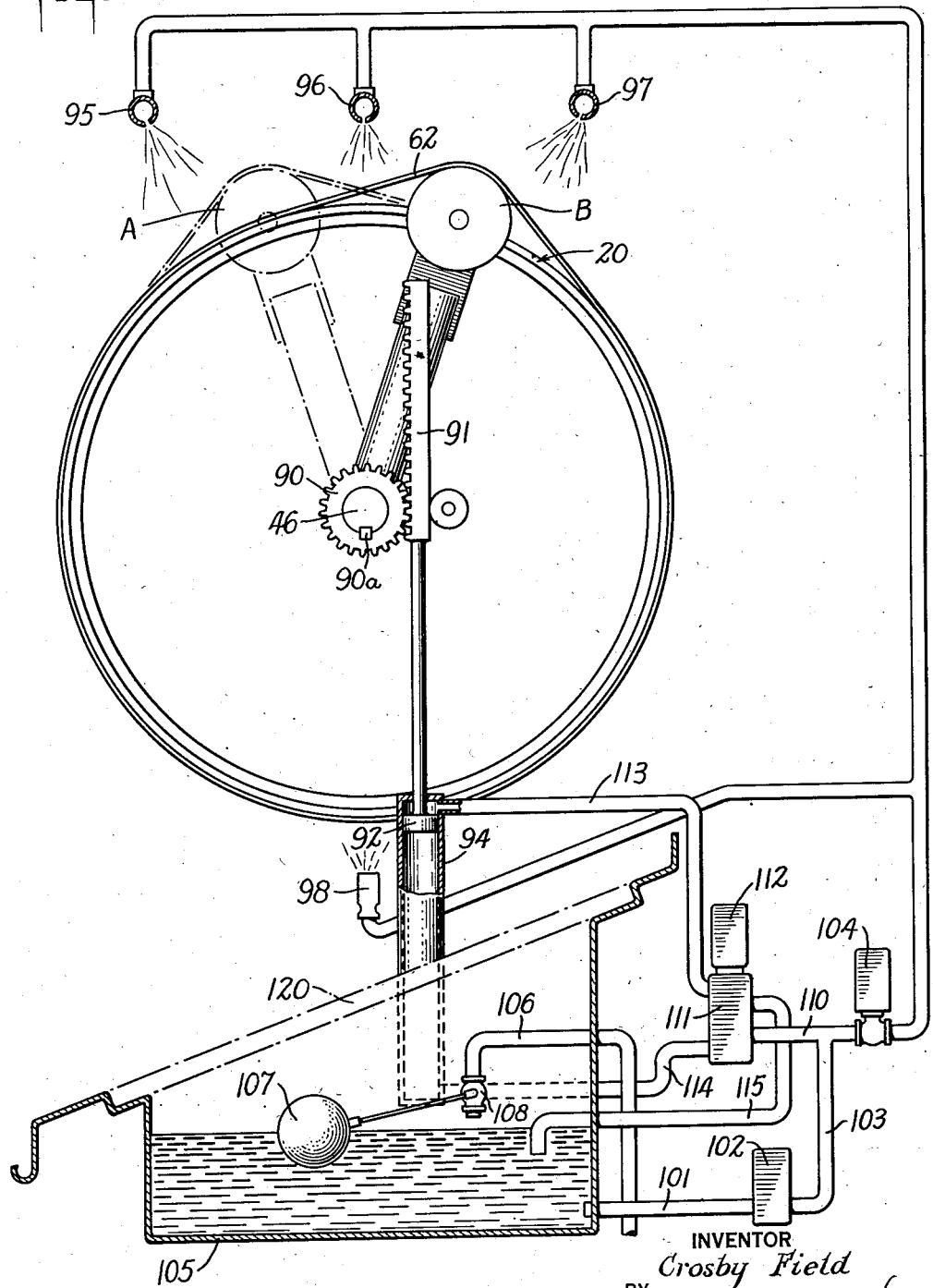

Patented Sept. 16, 1952

2,610,475

UNITED STATES PATENT OFFICE 2,610,475

ART OF CONGELATION AND APPARATUS FOR USE IN CONNECTION THEREWITH

Crosby Field, Brooklyn, N. Y., assignor to Flakice Corporation, Brooklyn, N. Y., a corporation of Delaware Application August 15, 1940, Serial No. 352,708

17 Claims. (Cl. 62—106)

This invention relates to the art of congelation and to apparatus for use in connection therewith. Thus, for example, the invention may be used for freezing liquid or solid foodstuffs or for making ice or in general for congealing material to convert it from a liquid or vapor state into a solid state.

One of the objects of this invention is to provide new and improved freezing apparatus. Another object is to provide a new and improved art of freezing. Other objects will be in part obvious and in part pointed out hereinafter.

The invention accordingly consists in the features of construction, combinations of elements, and arrangements of parts, and in the several steps and order of each of the same to one or more of the others, all as will be illustratively described herein, and the scope of the application of which will be indicated in the following claims.

In the drawings is shown apparatus for carrying out the method disclosed in this application.

Figure 1 is a vertical axial section of the freezing apparatus;

Figure 2 is a vertical section taken along the line 2—2 of Figure 1; and

Figure 3 is a diagrammatical showing of apparatus for alternately spraying liquid to be frozen on the freezing surface of the machine of Figure 1, and driving flexing mechanism to flex the freezing surface to free the material frozen thereon.

Similar reference characters refer to similar parts throughout the several views of the drawing.

In my United States Patent No. 2,005,733, there is disclosed method and apparatus for freezing ice in thin layers or for rapidly freezing materials, such as foodstuffs. This is accomplished by freezing the material on a thin metal belt and subsequently flexing the belt to cause the material frozen thereon to peel off. As disclosed in the patent and as carried out commercially, the belt is refrigerated from the interior by means of brine, which in turn is cooled by the usual ammonia refrigerating system utilizing a compressor for compressing the refrigerant and an evaporator in which the liquid refrigerant is expanded to a vapor state to accomplish the cooling effect.

In some instances, and particularly when smaller units are made, it is desirable to do away with the brine and an external evaporator and to carry out the initial cooling step in apparatus located within the freezing belt itself. It is another object of the present invention to provide improved method and apparatus for obtaining the desired heat transferring relationship between such initial cooling apparatus.

The present embodiment in general comprises a stationary cylindrical evaporator which is encompassed by an endless belt, having a diameter larger than that of the evaporator drum. Between the belt and the drum is a roller urged outwardly against the belt and away from the drum to hold the belt under tension against the drum. The roller is mounted to revolve about the axis of the drum to continually roll along the belt to progressively lift portions of the belt from the drum and simultaneously flex such portions. Between the contacting surfaces of the belt and the drum, there is a film of heat transferring liquid which ensures the desired heat transfer between the belt and the evaporator. Liquid to be frozen is sprayed on the outer surface of the belt and when frozen is peeled therefrom by flexing action just described.

Referring now to Figures 1 and 2, the apparatus is supported by a pair of end plates, generally indicated at 10 and 12, which are rectangular in shape (Figure 2). The lower portions of these plates are held in spaced relationship by a pair of spacing rods 14 and 16, the ends of which are secured to the end plates by pairs of nuts 18 (Figure 1). As best seen in Figure 1, the nuts of each pair are positioned on opposite sides of the plates and thus when turned in opposite directions, they move toward each other to grip the plates and thus securely fasten the rods thereto.

The evaporator drum, generally indicated at 20, includes a cylinder 22 of circular shape (Figure 2) having its ends closed by a pair of curved heads 24 and 26. Heads 24 and 26 have annular flanges 24a and 26a formed on their outer edges, the outer diameter of which is substantially equal to the inner diameter of cylinder 20 (Figure 1). Heads 24 and 26 are positioned in the ends of the cylinder with their convex surfaces facing inwardly; then flanges 24a and 26a are secured to the cylinder in any suitable manner, such as by welding. Thus, an evaporator is made sufficiently strong to withstand the internal maximum pressures to which it may be subjected.

Extending through heads 24 and 26 in the top portions thereof are a pair of holes 28 and 30 (Figure 1). These are adapted to receive a conduit, generally indicated at 32, which extends through drum 20 and has one end 35 connected to a supporting plate 34 and the other end 36 extending through a hole 37 formed in end plate 12. Conduit 32 is secured to heads 24 and 26 by welding to prevent any leakage at the points at which it passes therethrough, and it is also welded to supporting plate 34 sealing that end of the conduit. Supporting plate 34 is connected to end plate 10 by bolts and nuts 38. The other end of conduit 32 is preferably welded to end plate 12 and thus conduit 32 is one of the supports for drum 20.

To aid conduit 32 in supporting drum 20, a pair of gusset plates 39 and 40 (Figure 1) are provided. Plate 39, which is positioned vertically beneath conduit 32 (Figure 2), extends between and is welded to end plate 12 and head 24. Plate 40, which is similar to plate 39, extends between and is welded to head 26 and supporting plate 34. Thus, drum 20 is securely connected to end plates 10 and 12 by conduit 32, gusset plates 39 and 40, and supporting plate 34.

The evaporator drum 20 is refrigerated by introducing the refrigerant from the high pressure side of a refrigerating system through a pipe 80 extending from the left-hand end plate 12 down through to the inside of the evaporator drum. This liquid is evaporated in the drum which is thereby cooled and the spent refrigerant leaves the drum at the top through a hole 81 provided in the conduit 32. This conduit is connected with the suction side of the refrigerating system.

Extending through the center of heads 24 and 26, parallel to the sides of drum 20, is a cylindrical passage provided by a tube 41. The ends of this tube preferably extend beyond the ends of heads 24 and 26, and its sides are welded thereto to prevent any leakage therearound.

This passage permits a shaft 46 to freely pass through the drum to either side thereof without the necessity of any packing glands and this shaft rotates in gearings 42 and 43 mounted respectively in end plates 10 and 12 as shown. These bearings are secured to the end plates by suitable bolts 42a and 43a.

As is best shown in Figures 1 and 2, a pair of deflector supporting arms, generally indicated at 47 and 48, are mounted on shaft 46 between end plates 10 and 12 and the ends of drum 20. These deflectors are keyed to shaft 46, and shaft 46 is held in proper axial position in bearings 42 and 43 by a pair of collars 70 and 71 which are locked in place on the shaft by set screws 70a and 71a, and which collars bear against the inner faces of the hubs of the deflectors. As these deflectors are substantially similar in construction, the description will be limited to deflector 48.

Referring now to Figure 2, the hub 49 of deflector 48 is keyed to shaft 46 by a key 50. The supporting arm 48 includes a tube 51 welded to the hub 49 which is adapted to slidably receive a plunger rod 52 carrying a flat plate 53 at its outer end. Plate 53 is prevented from rotation with respect to the tubes 51 by slots 54 and 55 in tube 51 in which the plate 53 slides. A shaft 57 mounted on a bearing 56 (Figures 1 and 2) secured to the upper end of plate 53 rotatably mounts a pair of deflector rollers 58 and 59. A spring 82 is positioned between the lower end of rod 52 and hub 59, and resiliently presses outwardly on the bottom of the plunger rod.

Thus, rollers 58, 59, 60 and 61 on the ends of supporting arms 47 and 48 rotate around evaporator drum 20 as shaft 46 is turned. The axis of the rollers are kept parallel to the axis of the shaft by means of the plates riding in the slots of the guide tubes as above described, and the springs mounted within the guide tubes resiliently press the rollers outwardly into contact with the belt on the machine.

This flexible metal belt, encompassing as it does the stationary evaporator drum, is also movably but non-rotatably mounted with respect to the drum, and the ends of the flexible cylinder formed by the metal belt are closed and sealed from the atmosphere. These results are obtained by means of rubber aprons 63 and 64, respectively, secured to the ends of the cylindrical panel 62 and to the end plates 10 and 12 through the medium of annular rings 72 and 73. Thus, with this construction, the evaporator drum is effectively sealed from the atmosphere inside the flexible belt.

Aprons 63 and 64 (Figure 1) have thickened portions on their inner edges which form tracks on which the deflecting rollers ride and the outer rollers 58 and 61 each have flanges 58a and 61a which follow the outer edges and maintain the flexible belt in proper axial relationship with respect to the evaporator drum. The apron may be secured to the ends of the panel such as described in my Patent No. 2,078,938. Thus, supporting arms 47 and 48 (Figure 2) through the rollers mounted thereon resiliently maintain the greater portion of belt 62 in heat transferring relationship with the evaporator and at the point of contact with the belt. The deflecting rollers change the curvature of the belt to a smaller radius such as to cause a solid frozen on the belt while shaped to the radius of the drum to peel from the belt as described in my Patent No. 2,112,596.

Referring to Figure 2, if the flexing rollers 58, 59, 60, and 61 are revolved in counter-clockwise direction about the axis of shaft 46, the surface of the belt under which the rollers pass is progressively flexed to cause liquid frozen thereon to peel from the drum. This operation of the deflector roller is obtained by rotating shaft 46 to cause the rollers to revolve about the axis of the shaft and to roll around the inside surface of the flexible belt. This rolling action if continued in the same direction would cause the belt to apparently creep around the drum 20, which apparent creeping action would be restrained by the aprons 63 and 64 secured to the end plates. However, there is no sliding action between the belt and the cylinder as the creeping is caused by the wave carried around the cylinder by the deflector rollers. The strain to which the aprons 63 and 64 would otherwise be subjected is eliminated in the present embodiment by causing the deflector rollers to revolve first in one direction about the axis 46 and then in the reverse direction. As shown in Figure 3 in the dotted and full line positions A and B of the deflector roller, the deflector roller first moves around the axis 46 to one side of the pipe 32 and then reverses its action to move to the other side of the pipe 32 so that the travel of the belt around the evaporator drum caused by the movement of the rollers in one direction is exactly offset by the reverse movement of the rollers.

The tension put on the belt by the deflecting rollers holds the belt in close heat transferring relationship with respect to the surface of the evaporator drum 20 and so provides for heat transfer between the two. But in the present embodiment this heat transfer relationship is further improved by providing a liquid film between the belt and the evaporator drum. This film is preferably thin and has a higher heat transfer coefficient than would be obtained by an imperfect metal-to-metal contact.

The connections between belt 62, aprons 63 and 64, and end plates 10 and 12 are liquid-tight, and all other outlets from the interior of the belt are sealed against atmospheric pressure. Thus, the space between drum 20 and the belt, aprons, and end plates is adapted to hold a liquid which is preferably a non-corrosive, low-freezing type, and having desirable heat transfer efficiency when in a thin film, such as propylene glycol solution. This liquid forms a thin film between the belt and the surface of the drum and fills the microscopic interstices between the solid surfaces and improves the heat transfer efficiency between the belt and the drum.

In addition to improving the heat transfer efficiency, the presence of the liquid not only lubricates the belt 62 and the evaporator 20 to reduce the friction therebetween and so further remove the possibility of strain being placed upon the aprons from the apparent creeping action above mentioned, but it also provides sufficient lubrication for the bearings of the deflector rollers as the supporting arms reciprocate back and forth. To this end the liquid may be present in the bottom of the sealed space between end plates 10 and 12 to a depth of several inches thus to lubricate the bearings of the deflector rollers, as in any splash lubrication system, and to work its way by capillary action between the belt and drum. The remainder of the sealed space, however, contains only such air as may be trapped therewithin and, accordingly, the end plates are effectively insulated from the cold end walls of drum 20.

The reciprocation of the deflector rollers may be conveniently accomplished by the mechanism shown in Figures 1 and 3. This mechanism includes a gear 90 keyed to the right end of shaft 46 by a key 90a. This gear meshes with a rack 91 (Figures 1 and 3) connected to a piston 92 mounted in a piston cylinder 94. As the piston 92 moves upwardly and downwardly, it moves the rack with a reciprocating action.

Below the belt is a sump tank 105 which is supplied with liquid through conduit 106. A constant level of liquid is maintained within this tank by means of a float 107 which operates a valve 108 on the end of a supply conduit 106. To supply liquid to the piston, pump 102 draws liquid from the sump 105 through conduit 101 and forces it upwardly through conduit 103. Conduit 103 has a branch 110 which leads to a four-way valve 111 operated by solenoid 112. Leading from valve 111 to piston cylinder 94 are a pair of conduits 113 and 114 which are connected to the opposite ends thereof. Thus, liquid passing through these conduits acts alternately on opposite faces of piston 92. A return conduit 115 from valve 111 is provided to carry exhaust liquid from cylinder 94 to the sump. Solenoid 112 is controlled by an electrical contact (not shown) so that it reverses the valve 111 at the end of each stroke of the piston 92.

In order to spray liquid on the surface of belt 62, a plurality of nozzles 95, 96, 97, and 98 are provided. Nozzles 95, 96, and 97 are positioned above the belt and spray liquid downwardly upon it, while nozzle 98 is positioned beneath the belt and sprays liquid upwardly. By positioning these nozzles in this manner, excellent coverage of the surface of the belt by the liquid is obtained.

In operation, pump 102 supplies liquid to the nozzles which spray liquid upon the surfaces of the belt. This liquid freezes thereon and any excess drains off the bottom and passes through screen 120 into the sump 105. To remove a layer of frozen liquid from the belt, solenoid 104 is connected to an electrical control which intermittently energizes it. When solenoid 104 is energized, the valve closes; cutting off the nozzle spray causing the pressure in the line 110 to build up sufficiently to move the piston 92 as above described, the valve 111 having previously been properly positioned. At the moment the piston 92 completes its stroke, the solenoid 112 operates to reverse the valve 111. The solenoid 104 is de-energized and the liquid again flows through the nozzles. Thus, liquid is not sprayed onto the belt when the frozen liquid is being deflected therefrom, the deflector rollers do not operate during the spraying operation, and the frozen liquid may be peeled from the freezing surface in a substantially dry or sub-cooled condition. The frozen product falling from the machine is prevented from falling into the liquid in the sump by means of the screen 120.

It will thus be seen that a thoroughly practical and efficient freezing method and apparatus for use in connection therewith has been disclosed in which the objects described hereinabove, as well as many others, have been successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. In congealing apparatus of the class described, an evaporator having an external convexly curved refrigerated surface, a flexible metal belt extending along said refrigerated surface, means for continuously holding a portion of said belt under tension in heat transferring relationship against said convexly curved refrigerated surface and deflector means for maintaining another portion of said belt under tension and flexed to a diameter smaller than said convexly curved refrigerated surface, means for supplying material to be congealed to the portion of said belt maintained in said heat transferring relationship, and oscillating means for progressively relatively shifting the deflector means with respect to said belt to progressively flex said belt to remove therefrom material congealed thereon, said oscillating means including a drive member and a driven member, said drive member alternately acting upon said driven member first in one direction and then in another direction.

2. In congealing apparatus of the class described, an evaporator having an external convexly curved refrigerated surface, a flexible metal belt extending along said refrigerated surface, means for continuously holding a portion of said belt under tension in heat transferring relationship against said convexly curved refrigerated surface and deflector means for maintaining another portion of said belt under tension and flexed to a diameter smaller than said convexly curved refrigerated surface, means for supplying material to be congealed to the portion of said belt maintained in said heat transferring relationship, means oscillating with respect to said refrigerated surface for progressively relatively shifting the deflector means and belt to progressively flex said belt to remove therefrom material congealed thereon, and flexible means for holding said belt and evaporator against substantial traveling motion with respect to each other.

3. In congealing apparatus of the class described, an evaporator having an external convexly curved refrigerated surface, a flexible metal belt extending along said refrigerated surface, means for continuously holding a portion of said belt under tension in heat transferring relationship against said convexly curved refrigerated surface and deflector means for maintaining another portion of said belt under tension and flexed to a diameter smaller than said convexly curved refrigerated surface, means for supplying material to be congealed to the portion of said belt maintained in said heat transferring relationship, means oscillating with respect to said refrigerated surface for progressively relatively shifting the deflector means relative to said belt to progressively flex said belt to remove therefrom material congealed thereon, and flexible means for holding said evaporator and said belt against substantial traveling motion with respect to each other, said last-named means comprising an elastic apron effectively connecting the edge portions of said belt and said evaporator.

4. In congealing apparatus of the class described, an evaporator having an external convexly curved refrigerated surface, a flexible metal belt extending along said refrigerated surface, means for continuously holding a portion of said belt under tension in heat transferring relationship against said convexly curved refrigerated surface and deflector means for maintaining another portion of said belt under tension and flexed to a diameter smaller than said convexly curved refrigerated surface, means for supplying material to be congealed to the portion of said belt maintained in said heat transferring relationship, and means oscillating with respect to said refrigerated surface for progressively relatively shifting the deflector means and said belt to progressively flex said belt to remove therefrom material congealed thereon, said deflector means comprising a roller between said belt and said evaporator and revolvable about the axis of said convexly curved surface.

5. In congealing apparatus of the class described, an evaporator having an external convexly curved refrigerated surface, a flexible metal belt extending along said refrigerated surface, means for continuously holding a portion of said belt under tension in heat transferring relationship against said convexly curved refrigerated surface and deflector means for maintaining another portion of said belt under tension and flexed to a diameter smaller than said convexly curved refrigerated surface, means for supplying material to be congealed to the portion of said belt maintained in said heat transferring relationship, and oscillating means for progressively relatively shifting the deflector means and said belt to progressively flex said belt to remove therefrom material congealed thereon, said deflector means including guide means located between the inner periphery of said belt and said refrigerated surface, said oscillating means including a drive member and a driven member, said drive member alternately acting upon said driven member first in one direction and then in another direction.

6. In congealing apparatus of the class described, an evaporator having an external convexly curved refrigerated surface, a flexible metal belt extending along said refrigerated surface, means for continuously holding a portion of said belt under tension in heat transferring relationship against said convexly curved refrigerated surface and deflector means for maintaining another portion of said belt under tension and flexed to a diameter smaller than said convexly curved refrigerated surface, means for supplying material to be congealed to the portion of said belt maintained in said heat transferring relationship, and oscillating means for producing relative movement between said belt and said deflecting means to progressively relatively shift the portions of said belt with respect to said belt and progressively flex said belt to remove therefrom material congealed thereon, said oscillating means including a drive member and a driven member, said drive member alternately acting upon said driven member first in one direction and then in another direction.

7. In refrigerating apparatus, in combination, a substantially cylindrical evaporator, a framework for supporting said evaporator, a shaft extending through the center of said evaporator and journaled to said framework, deflector means secured to said shaft, an endless belt of greater length than the circumference of said evaporator extending therearound said deflector means resiliently holding said belt in contact with said evaporator, and means for turning said shaft to rotate said deflector means around said evaporator to flex successive sections of said belt out of contact therewith.

8. In refrigerating apparatus, in combination, a substantially cylindrical evaporator, a framework for supporting said evaporator, a shaft extending through the center of said evaporator and journaeld to said framework, deflector means secured to said shaft, an endless belt of greater length than the circumference of said evaporator extending therearound, said deflector means resiliently holding said belt in contact with said evaporator, means for turning said shaft to rotate said deflector means around said evaporator to flex successive sections of said belt out of contact therewith, means closing the open sides of said endless belt, and a liquid having a freezing point lower than the operative temperature of said evaporator positioned between said belt and said evaporator.

9. In refrigerating apparatus, in combination, a substantially cylindrical evaporator, a framework for supporting said evaporator, a shaft extending through the center of said evaporator and journaled to said framework, deflector means secured to said shaft, an endless belt of greater length than the circumference of said evaporator extending therearound, said deflector means, resiliently holding said belt in contact with said evaporator, means for turning said shaft to rotate said deflector means around said evaporator to flex successive sections of said belt out of contact therewith, a pair of end plates, a pair of elastic aprons extending between and secured to the edges of said belt and said end plates, and a liquid of a type similar to propylene glycol positioned between said belt and said evaporator.

10. In refrigerating apparatus, in combination, an evaporator of substantially cylindrical shape, an endless flexible belt encompassing said evaporator, a shaft extending through said evaporator, a deflector member mounted on said shaft and adapted to flex successive sections of said belt out of contact with said evaporator as said shaft is rotated, a plurality of nozzles for spraying a liquid on said belt, means for rotating said shaft in a reciprocating movement, said last-mentioned means being operated by the fluid from the same source as that sprayed through said nozzles, and valve means to alternately supply liquid to said nozzles and to said last-mentioned means, whereby the operation of said apparatus is continuous, the freezing of liquid on said belt and deflecting frozen material therefrom taking place alternately.

11. In refrigerating apparatus, in combination, an evaporator of substantially cylindrical shape, an endless belt encompassing and contacting the refrigerated surface of said evaporator, means for supplying liquid to be frozen to the surface of said belt, deflector means positioned between said belt and said evaporator for flexing said belt to remove frozen liquid therefrom, a tank, and a slanting screen positioned over said tank, said tank being positioned beneath said evaporator, whereby surplus liquid supplied to said belt drains through said screen into said tank and said slanting screen prevents said frozen material from entering said tank.

12. The method of congealing material on the surface of a flexible impervious belt and removing the congealed material by flexing said belt comprising the steps of: maintaining a portion of said flexible belt under tension in conformity with and in heat transferring relationship with a convexly curved refrigerated surface, supplying to said flexible belt while in such condition material to be frozen, continually removing portions of said flexible belt from said refrigerated surface, and flexing said portions to remove material congealed thereon, said continual removing action progressing first in one direction along said belt and then in the reverse direction.

13. In refrigerating apparatus, in combination, a stationary cylindrically shaped evaporator having a continuous curved refrigerated surface, an endless flexible belt encompassing said refrigerated surface, flexible means secured to and closing the open sides of said endless belt and adapted to have relative rotational movement with respect to said evaporator, deflecting means mounted between said refrigerated surface and said belt for flexing said flexible belt as said belt and said deflecting means move with respect to each other, and means for causing relative movement between said belt and said evaporator, and between said belt and said deflecting means.

14. A refrigerating apparatus comprising: a refrigeratable drum means; an endless imperforate flexible belt longer than the circumference of the drum means and extending therearound; end structure at each end of the drum means and including belt anchoring portions thermally isolated from the drum means and rigidly disposed with respect thereto; skirt means preventing progressive movement between the drum means and belt and sealing the entire length of the edges of the belt to the belt anchoring portions; and means for maintaining all but a small portion of the belt in contact with the drum means.

15. A refrigerating apparatus, comprising: a refrigerated drum, means insulating the ends of said drum, an endless, imperforate, flexible belt, longer than the circumference of the said drum, and placed around and in contact with said drum, means preventing progressive movement between said drum and belt, and sealing the entire length of the edges of said belt, and means for maintaining all but a small portion of said belt in contact with said drum.

16. A refrigerating apparatus, comprising: a refrigerated drum, means insulating the ends of said drum, an endless, imperforate, flexible belt, longer than the circumference of the said drum, and placed around and in contact with said drum, means preventing progressive movement between said drum and belt, and sealing the entire length of the edges of said belt to the means insulating the ends of said drum, and means for maintaining all but a small portion of said belt in contact with said drum.

17. In refrigerating apparatus, in combination, an evaporator having a continuous curved refrigerated surface, an endless flexible belt encompassing said refrigerated surface and contacting a portion thereof, means closing the open sides of said endless belt, deflector means adapted to flex successive sections of said belt out of contact with said evaporator, and a liquid positioned between said belt and said refrigerated surface adapted to keep wet the contacting surfaces thereof, said curved refrigerated surface portion being circularly cylindrical throughout about a fixed straight-line axis, said endless belt lying in a predetermined endless path encompassing and co-extending with said refrigerated surface portion, said path being cylindrical throughout about said fixed straight-line axis, said path describing a plurality of curves of which all the centers of curvature lie on one side of the belt, said deflector means having belt-supporting surfaces predetermining said endless path in the regions of belt flexure, and said belt-supporting surfaces extending across and supporting the marginal edges of the inside of said belt.

CROSBY FIELD.

REFERENCES CITED

The following references are of record in the file of this patent:

UNITED STATES PATENTS

| Number | Name | Date |
| --- | --- | --- |
| 1,451,901 | Field | Apr. 17, 1923 |
| 1,451,902 | Field | Apr. 17, 1923 |
| 1,451,903 | Field | Apr. 17, 1923 |
| 1,451,904 | Field | Apr. 17, 1923 |
| 1,480,382 | Field | Jan. 8, 1924 |
| 1,803,212 | Schroeder | Apr. 28, 1931 |
| 2,005,733 | Field | June 25, 1935 |
| 2,005,734 | Field | June 25, 1935 |

FOREIGN PATENTS

| Number | Country | Date |
| --- | --- | --- |
| 603,859 | Germany | Oct. 9, 1934 |